United States Patent [19]
Suzuki et al.

[11] Patent Number: 5,736,270
[45] Date of Patent: Apr. 7, 1998

[54] BATTERY DEVICE

[75] Inventors: Hirotsugu Suzuki, Chiba; Nobuhiro Fujiwara, Kanagawa, both of Japan

[73] Assignee: Sony Corporation, Tokyo, Japan

[21] Appl. No.: 660,427

[22] Filed: Jun. 7, 1996

[30] Foreign Application Priority Data

Jun. 8, 1995 [JP] Japan ................... 7-167010

[51] Int. Cl.⁶ .................................. H01M 2/22
[52] U.S. Cl. .................................. 429/94; 429/161
[58] Field of Search ........................ 429/94, 161

[56] References Cited

U.S. PATENT DOCUMENTS

| | | | |
|---|---|---|---|
| 4,053,687 | 10/1977 | Coibion et al. | 429/94 |
| 4,539,274 | 9/1985 | Goebel | 429/94 |
| 4,963,446 | 10/1990 | Roels et al. | 429/94 |
| 5,008,161 | 4/1991 | Johnston | 429/94 |
| 5,571,632 | 11/1996 | Teramoto | 429/94 |

*Primary Examiner*—Stephen Kalafut
*Attorney, Agent, or Firm*—Hill, Steadman & Simpson

[57] ABSTRACT

A battery device having a high discharge current value and a high current collecting efficiency at electrodes. A first active material is applied on a first current collecting unit avoiding one end and/or the other end of the width direction to form an anode, and a second active material is applied on a second current collecting unit avoiding one end and/or the other end of the width direction to form a cathode. The current generated at the electrodes formed by winding the anode and cathode via separators is output through the parts uncoated with the first active material of anode and the parts uncoated with the second active material of cathode, so as to realize the battery device having a high discharge current value and a high current collecting efficiency at the electrodes.

11 Claims, 5 Drawing Sheets

BATTERY DEVICE

BACKGROUND OF THE INVENTION

1. Field of the Invention

This invention relates to a battery device and is applicable especially to a large-size battery device having cylindrical shape.

2. Description of the Related Art

A conventional battery device is constructed as shown in FIG. 1, for example.

In a conventional battery device 1, an inner tube 4 made of aluminum wound by belt-shaped electrodes 3 is inserted into an outer tube 2 which is produced by plating a steel tube with nickel, and each bead processed portion 2A which is the end of the outer tube 2 in the longitudinal direction is caulked to the ends of the inner tube 4 by a corresponding ring-shaped gasket 6 into which a sealing plate 5 is inserted.

In this case, the electrodes 3, as shown in FIGS. 2 and 3, is formed by successively layering a first separator 10 being, e.g., microporous polypropylene film, an anode 13 produced by applying an anode active material 12 on both of surfaces of a first current collecting unit 11 being a belt-shaped metallic foil (e.g., aluminum foil) avoiding both of ends of the first current collecting unit 11 in the longitudinal direction, a second separator 14 being, e.g., microporous polypropylene film, and a cathode 17 produced by applying a cathode active material 16 on both of surfaces of a second current collecting unit 15 being a belt-shaped metallic foil (e.g., aluminum foil) avoiding both of ends of the second current collecting unit 15 in the longitudinal direction. The electrode assembly 3 is wound around the inner tube 4 with the first separator 10 being innermost.

Further, as shown in FIG. 2, anode leads 18A, 18B are respectively fixed by the resistance welding, etc. to parts 13A uncoated with the anode active material 12 at the ends of the anode 13 in the longitudinal direction (in FIG. 2, slanted line parts of the anode 13) and cathode leads 19A, 19B are respectively fixed by the resistance welding, etc. to parts 17A uncoated with the cathode active material 16 at the ends of the cathode 17 in the longitudinal direction (in FIG. 2, slanted line parts of the cathode 17). Each of anode leads 18A, 18B is electrically connected to the inner tube 4 at the ends, and each of cathode leads 19A, 19B is conductively connected to the outer tube 2 at the ends by the resistance welding, etc. Moreover, the outer tube 2 is filled up with predetermined nonaqueous electrolyte.

In this way, in the battery device 1, the discharge reaction occurs at the anode 13 and the cathode 17 to generate an electric current and the generated current can be output to the outside during discharging, with the outer tube 2 which is conductively connected with the anode 13 through the anode leads 18A, 18B used as an anode terminal, and the inner tube 4 which is conductively connected with the cathode 17 through the cathode leads 19A, 19B used as a cathode terminal.

In the battery device 1 constructed as described above, the electric current amount to be generated is determined depending on the areas of the anode 13 and cathode 17.

Extending the anode 13 and cathode 17 in a direction vertical to the longitudinal direction (width direction) has a problem that the battery device 1 becomes large. Therefore, in this type of battery device 1, the anode 13 and the cathode 17 are extended in the longitudinal direction to widen the area, so that the amount of discharge current is increased.

However, in the battery device 1 constructed as described above, when the anode 13 and the cathode 17 are extended in the longitudinal direction to widen the areas, the electrical path of current which flows through the anode 13 and cathode 17 becomes long, so that the internal resistance of the anode 13 and cathode 17 increase. Accordingly, the large voltage drops occurs in the current which flows through the anode 13 and cathode 17 and thus causes a problem of lowering the current collecting efficiency at the electrodes 3.

SUMMARY OF THE INVENTION

In view of the foregoing, an object of this invention is to provide a battery device which has a high discharge current value and high current collecting efficiency at the electrodes.

These and other objects of the invention have been achieved by the provision of a battery device in which as well as forming an anode by applying a first active material on a first current collecting unit avoiding one end portion and/or the other end portion of the first current collecting unit in the width direction, a cathode is formed by applying a second active material on a second current collecting unit avoiding one end portion or the other end portion of the second current collecting unit in the width direction. The anode and cathode are isolated by a separator and wound in the layered state to form electrodes. Then, the electric current generated at the electrodes is output from the electrodes through the parts uncoated with the first active material in the anode and the parts uncoated with the second active material in the cathode.

As a result, in the battery device, since the longest distance of the electrical path of the current flowing through the anode and cathode is short, about the width of anode or cathode, the current generated at the electrodes can be obtained without the occurrence of the voltage drops in the current flowing through the anode and cathode. In this case, the size of electric resistance for the current flowing through the anode and cathode depends only on the width of anode or cathode, and it does not depend on the length of anode and cathode, so that the discharge current value can be increased without lowering the current collecting efficiency at the electrodes.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
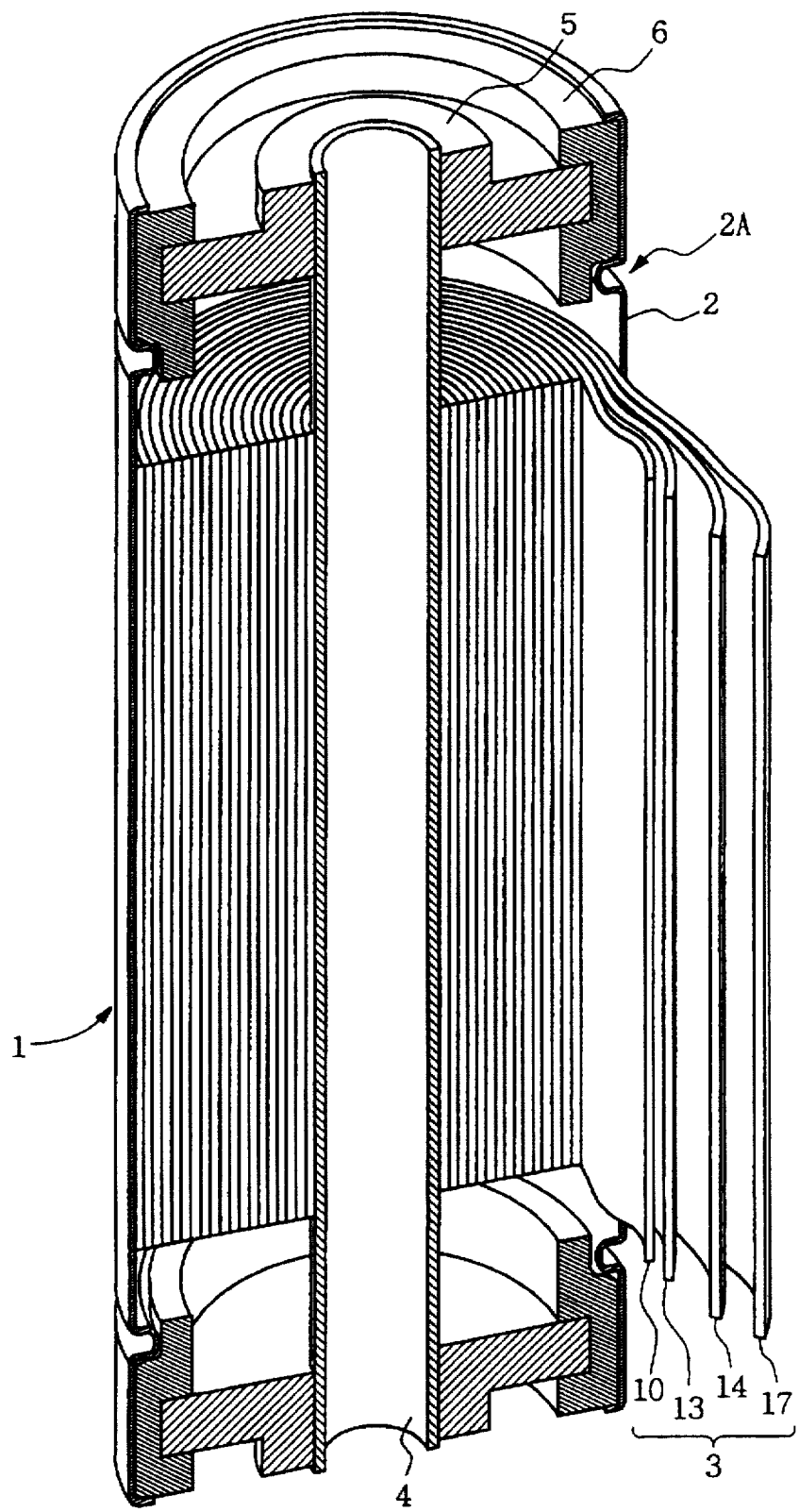
FIG. 1 is a perspective view showing the cross section of the conventional battery device.
Figure 2:
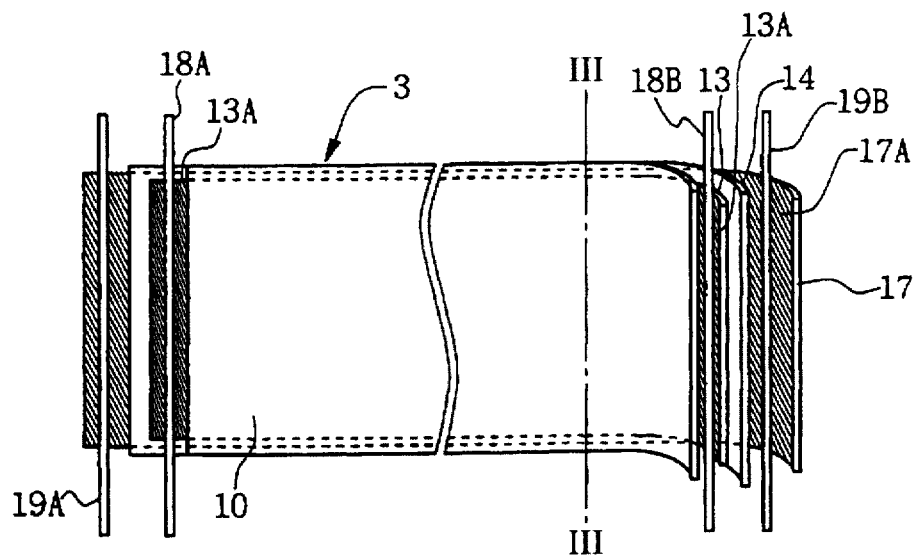
FIG. 2 is a schematic diagram showing the construction of the electrodes in the conventional battery device.
Figure 3:
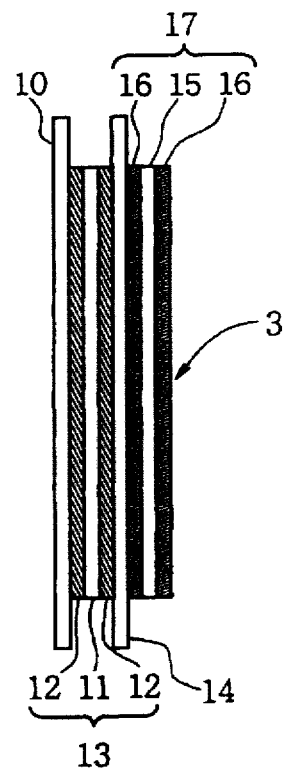
FIG. 3 is a cross sectional view showing the construction of the electrodes in the conventional battery device taken along view lines III—III of FIG. 2.
Figure 4:
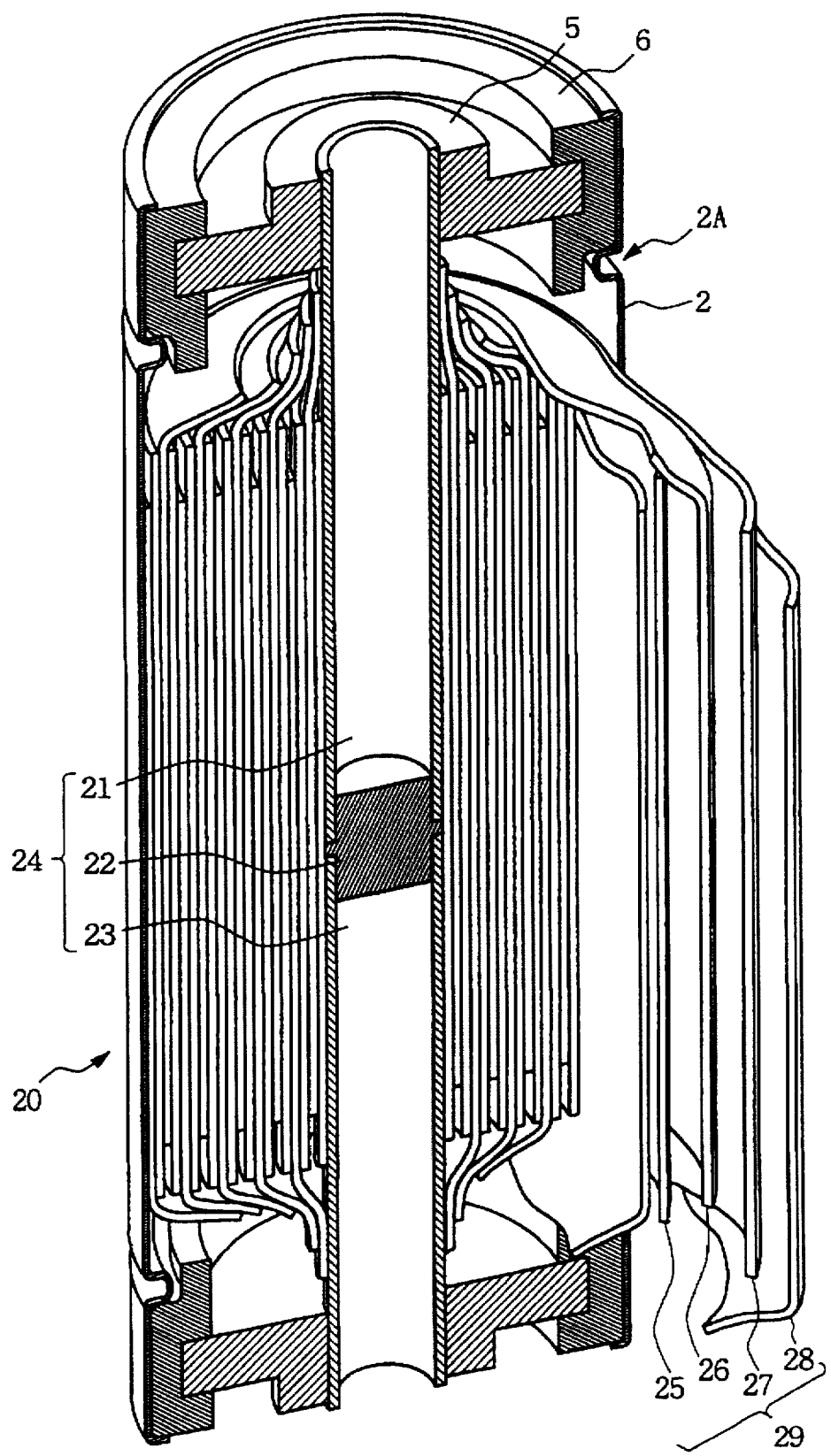
FIG. 4 is a perspective view showing the cross section of the construction of a battery device according to an embodiment.
Figure 5:
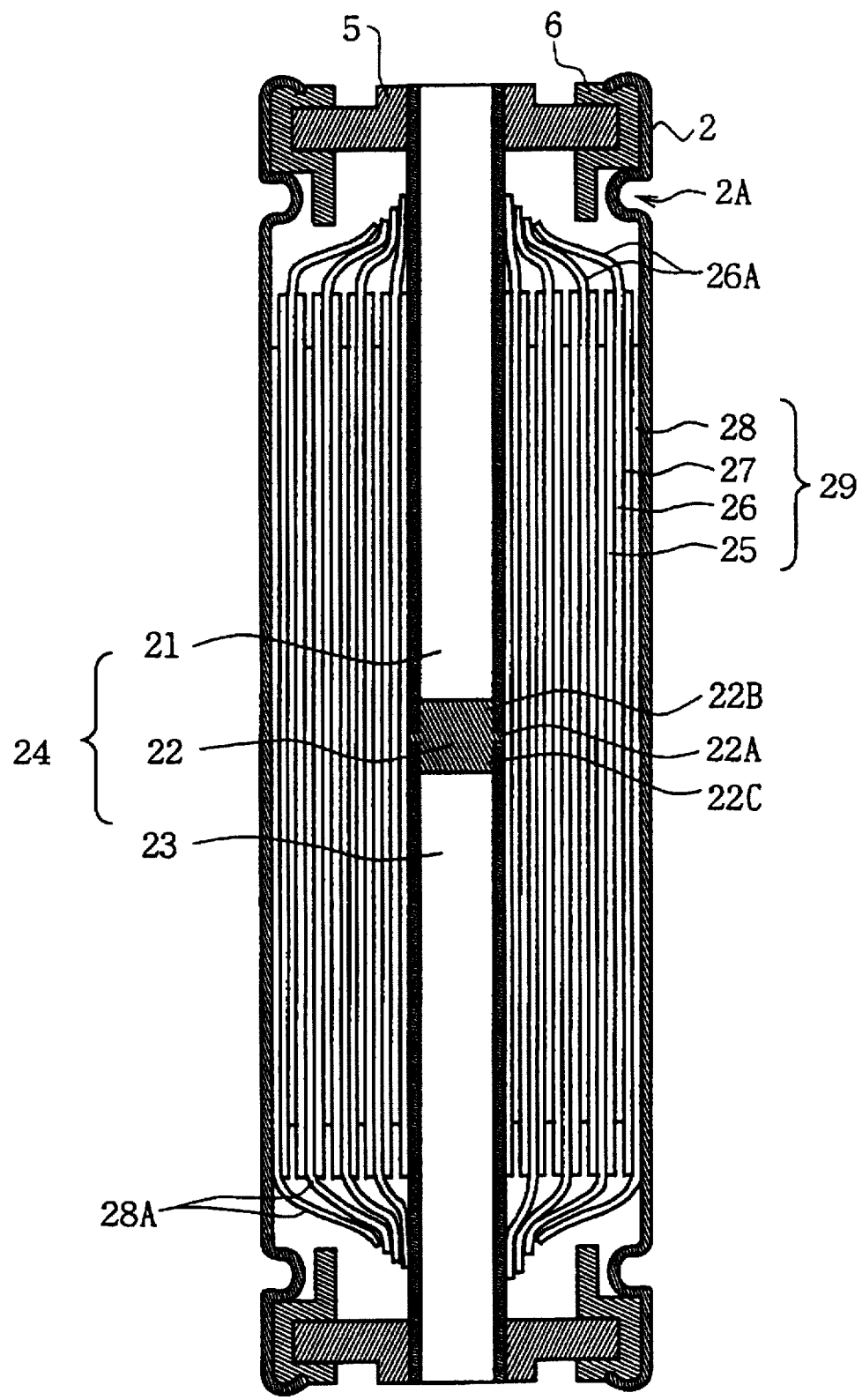
FIG. 5 is a cross sectional view showing the construction of the battery device according to the embodiment.

Preferred embodiment of this invention will be described with reference to the accompanying drawings:

As shown in FIGS. 4 and 5 in which the portions corresponding to those of FIG. 1 are designated with the same reference numerals or characters, 20 shows a battery device according to an embodiment as a whole. An inner tube 24 is formed by connecting a first circular cylindrical member 21 being a conductive material (e.g., aluminum) and a second circular cylindrical member 23 being a conductive material (e.g., copper) having the same outside diameter with the first circular cylindrical member 21 via an isolating member 22 being polypropylene, etc. to the same axis.

Around the inner tube 24, electrodes 29 formed by successively layering a first separator 25 being a microporous polypropylene film, a belt-shaped anode 26, a second separator 27 being a microporous polypropylene film, and a belt-shaped cathode 28 is winded in the longitudinal direction with the first separator 25 being innermost.

Figure 7:
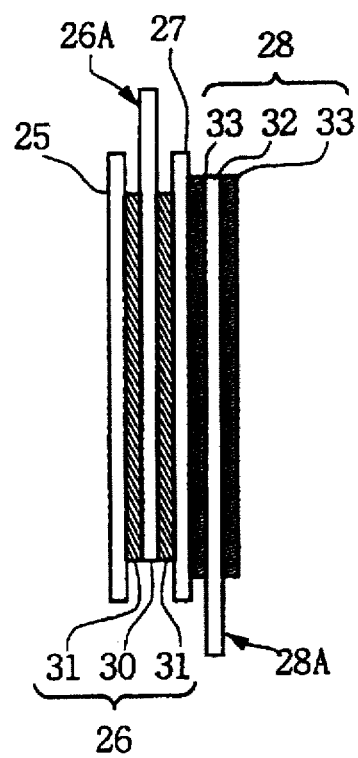
FIG. 7 is a cross sectional view showing the construction of the electrodes in the battery device according to the embodiment taken along view lines VII—VII in FIG. 6.

The anode 26 of the electrodes 29, as shown in FIG. 7, is produced by applying an anode compound slurry 31 on both of surfaces of a belt-shaped first current collecting unit 30 made of metallic foil (e.g., aluminum foil) avoiding one end of the first current collecting unit 30 in the width direction for a predetermined width, and drying it. The cathode 28 is produced by applying a cathode compound slurry 33 on both of surfaces of a belt-shaped second current collecting unit 32 made of metallic foil (e.g., copper foil) avoiding the other end of the second current collecting unit 32 in the width direction for a predetermined width which corresponds to the other end of the first current collecting unit 30 in the width direction, and drying it.

Figure 6:
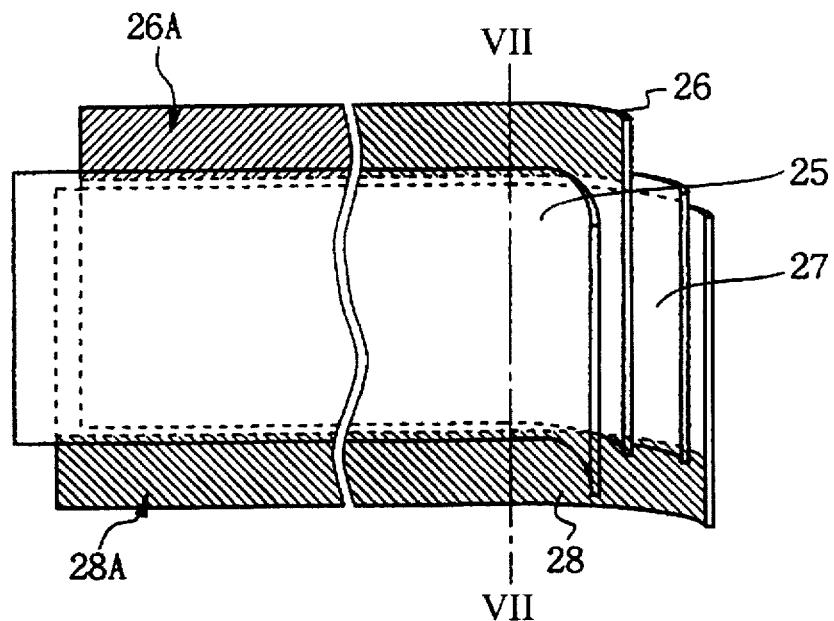
FIG. 6 is a schematic diagram showing the construction of the electrodes in the battery device according to the embodiment.

Further, the anode 26 and cathode 28 are stacked up via the second separator 27, in the state that the parts 26A uncoated with the anode compound slurry 31 in the anode 26 (in FIG. 6, slanted line parts of the anode 26) and the parts 28A uncoated with the cathode compound slurry 33 in the cathode 28 (in FIG. 6, slanted line parts of the cathode 28) are respectively shifted in the width direction not to overlap with one end of the cathode 28 in the width direction or the other end of the anode 26 in the width direction.

Furthermore, the parts 26A uncoated with the anode compound slurry 31 in the anode 26 is electrically and physically connected to the first circular cylindrical member 21 of the inner tube 24 by the method such as the super sonic welding or resistance welding directly or indirectly via the uncoated parts 26A at the internal circumference side. The parts 28A uncoated with the cathode compound slurry 33 in the cathode 28 is electrically and physically connected to the second circular cylindrical member 23 of the inner tube 24 by the method such as the super sonic welding or resistance welding directly or indirectly via the uncoated parts 28A at the internal circumference side. Moreover, a predetermined nonaqueous electrolyte is poured into the outer tube 2.

In this way, in the battery device 20, the discharge reaction occurs at the anode 26 and cathode 28 to generate the current at the electrodes 29 and the generated current is output to the outside during discharging, using the first circular cylindrical member 21 of the inner tube 24 conductively connected with the first current collecting unit 30 of the anode 26 as an anode terminal and using the second circular cylindrical member 23 of the inner tube 24 conductively connected with the second current collecting unit 32 of the cathode 28 as a cathode terminal.

For this construction, the larger width and length are specified in the first and second separators 25, 27 compared with the overlapped parts of anode 26 and cathode 28, so as to isolate surely between the parts 26A uncoated with the anode compound slurry 31 of anode 26, between the uncoated parts 26A and the first circular cylindrical member 21 of the inner tube 24, between the parts 28A uncoated with the cathode compound slurry 33 of cathode 28, and between the uncoated part 28A and the second circular cylindrical member 23 of the inner tube 24, in the state where the electrodes 29 is being winded around the inner tube 24.

In this embodiment, as shown in FIG. 5, on one surface and the other surface of a circular plate unit 22A which has the same external circumference as that of the first and second circular cylindrical members 21, 23, a cylindrical units 22B, 22C which have the external circumference same as the internal circumference of the first or second circular cylindrical member 21, 23 are formed at the same axis as a projection so as to form an isolator 22.

Therefore, in the battery device 20, the first or second circular cylindrical member 21, 23 is respectively inserted into each of cylindrical units 22B, 22C of the isolator 22 in producing, so as to easily construct the device in the state where the first and second circular cylindrical members 21, 23 are maintained on the same axis by the isolator 22.

Also, in this embodiment, what is used as the anode compound slurry 31 of the anode 26 is a composition comprising graphite, 6 weight %, as a conductor and polyvinylidene fluoride (PVDF) 3 weight % as an adhesive are respectively mixed with $LiCoO_2$ 91 weight % as an anode active material, which is dispersed into N-methyl pyrrolidone to form a slurry (paste state). What is used as the cathode compound slurry 33 of the cathode 28 is a composition comprising polyvinylidene fluoride 10 weight % as an adhesive is mixed with pitch coke 90 weight % as a cathode active material, which may be dispersed into N-methyl pyrrolidone to form a slurry. Further, what is used as a nonaqueous electrolyte is a 1 mol/lit. solution of $LiPF_6$ dissolved in an isoquant mixed solvent of propylene carbonate and 1,2-dimethoxy ethane.

With the above construction, in the battery device 20, during discharging, the discharge reaction occurs at the anode 26 and cathode 28 to generate the current at the electrodes 29 and the generated current is output to the outside using the first circular cylindrical member 21 of the inner tube 24 which is conductively connected with the first current collecting unit 30 of the anode 26 as an anode terminal and using the second circular cylindrical member 23 of the inner tube 24 which is conductively connected with the second current collecting unit 32 of the cathode 28 as a cathode terminal.

Therefore, in the battery device 20, the electrical path of the current flowing through the anode 26 and cathode 28 is short (about the width of the anode 26 or cathode 28 at maximum), accordingly, the internal resistance is small at respective electrical paths of the anode 26 and cathode 28, comparing to the case where the parts 13A uncoated with the anode active material 12 of the anode 13 (FIG. 1) and the parts 17A uncoated with the cathode active material 16 of the cathode 17 are respectively formed at the ends of the longitudinal direction of the anode 13 and cathode 17 as a conventional battery device 1 (FIG. 1). Therefore, in the battery device 20, the voltage drops hardly occurs in the current flowing through the anode 26 and cathode 28, so that high current collecting efficiency can be obtained at the electrodes 29.

It is assumed that the length $L_1$ of anode 26 is taken to be 300 cm, the width $L_2$ is 50 cm, and the electrical paths from the respective discharge reaction points of anode 26 to the parts 26A uncoated with the anode compound slurry 31 are on one straight line. In the case where the parts 26A uncoated with the anode compound slurry 31 is formed at the end of the width direction of anode 26 as this embodiment, the maximum value of electric resistance R1 from the respective discharge reaction points of the anode 26 to the parts 26A uncoated with the anode compound slurry 31 is equal to the electric resistance value $R_A$ from one end to the other end of the width direction of first current collecting unit 30, which can be obtained by substituting $L_2$=50 [cm] for the equation:

$$R_A = \rho \times \frac{L_2}{S} \; [\Omega \cdot cm] \tag{1}$$

where resistance coefficients in accordance with the material of the first current collecting unit 30 of the anode 26 is $\rho$, and the cross sectional area of the electrical path is S, to obtain the equation:

$$R1 = 50 \times \frac{\rho}{S} \; [\Omega \cdot cm] \tag{2}$$

On the contrary, as the conventional battery device 1 (FIG. 1), in the case where the parts 13A uncoated with the anode active material 12 of the anode 13 is formed at the end of the longitudinal direction of the anode 13, the maximum value of electric resistance $R_B$ from the respective discharge reaction points of the anode 13 to the parts 13A uncoated with the anode active material 12 equals to the electric resistance value from the center to the end of the longitudinal direction of the first current collecting unit 13, which can be obtained by substituting $L_1$=300 [cm] for the equation:

$$R_B = \rho \times \frac{L_1 \times \frac{1}{2}}{S} = \rho \times \frac{L_1}{2S} \; [\Omega \cdot cm] \tag{3}$$

where the same condition as the above case is used, to obtain the equation:

$$R2 = 300 \times \frac{\rho}{2S} = 150 \times \frac{\rho}{S} \; [\Omega \cdot cm] \tag{4}$$

According to this invention, as being apparent from the equations (2) and (4), the parts 26A uncoated with the anode compound slurry 31 of the anode 26 and the parts 28A uncoated with the cathode compound slurry 33 of the cathode 28 are respectively formed at the end of the longitudinal direction of the anode 26 or cathode 28, so that the maximum value of electric resistance at the anode 26 and cathode 28 can be ⅓ comparing to the conventional one. Therefore the current collecting efficiency at the anode 26 and cathode 28 can be improved.

According to the above construction, the parts 26A uncoated with the anode compound slurry 31 having the predetermined width is formed at the one end of the width direction of the anode 26, and the parts 28A uncoated with the cathode compound slurry 33 having the predetermined width is formed at one end of the width direction of the cathode 28. Then, the current generated at the electrodes 29 is output to the outside of the electrodes 29 through the parts 26A uncoated with the anode compound slurry 31 of anode 26 and the parts 28A uncoated with the cathode compound slurry 33 of the cathode 28, so that the voltage drops of the current flowing through the anode 26 and the cathode 28 can be surely prevented regardless of the length of the anode 26 and cathode 28. Therefore, without lowering the current collecting efficiency at the electrodes 29, the length of the anode 26 and cathode 28 can be extended, so that the battery device having a high discharge current value and high current collecting efficiency at the electrodes 29 can be realized.

The embodiment described above has been dealt with the case where the electrodes 29 is winded around the inner tube 24 in order to radiate the heat generated at the electrodes 29 to the outside efficiently. However, this invention is not only limited to this, but when the heat value at the electrodes 29 is small, the inner tube 24 is not used and the anode 26 and cathode 28 can be isolated each other via a separator being an isolating film and is winded in the longitudinal direction in the overlapping state to form the electrodes.

Further, the embodiment described above has been dealt with the case where the present invention is applied to the large size battery device 20. However, this invention is not only limited to this, but can be applied to the small size battery device.

Further, the embodiment described above has been dealt with the case where the present invention is applied to the lithium battery device. However, this invention is not only limited to this, but can be applied to the other battery devices.

Further, the embodiment described above has been dealt with the case where when the anode 26 and cathode 28 are layered with the second separator 2 being put between them, the parts 26A uncoated with the anode compound slurry 31 of the anode 26 and the parts 28A uncoated with the cathode compound slurry 33 of the cathode 28 are respectively stacked up in the state where they are shifted in the width direction not to face to one end of the width direction of the cathode 28 or the other end of the width direction of the anode 26. However, this invention is not only limited to this, but the anode 26 and cathode 28 can be stacked up with the second separator 27 being put between them in the state where they are not shifted in the width direction.

In this case, the width of first and second separators 25, 27 is made slightly wider than the anode 26 and cathode 28, to surely isolate between the anode 26 and cathode 28. At the same time, the leading wire can be used to conduct between the parts 26A uncoated with the anode compound slurry 31 of the anode 26 and the first circular cylindrical member 21 of the inner tube 24 and between the parts 28A uncoated with the cathode compound slurry 33 of the cathode 28 and the second circular cylindrical member 23 of the inner tube 24.

Further, the embodiment described above has been dealt with the case of using aluminum foil for the first current collecting unit 30 of the anode 26 and copper foil for the second current collecting unit 32 of the cathode 28. However, this invention is not only limited to this, but other materials can be used.

Further, the embodiment described above has been dealt with the case where the parts 26A uncoated with the anode compound slurry 31 of the anode 26 is formed at one end of the width direction of the first current collecting unit 30, and the parts 28A uncoated with the cathode compound slurry 33 of the cathode 28 is formed at the other end of the width direction of the second current collecting unit 32. However, this invention is not only limited to this, but if the parts 26A uncoated with the anode compound slurry 31 of the anode 26 can be formed at both ends of the width direction of the first current collecting unit 30, and/or the parts 28A uncoated with the cathode compound slurry 33 of the cathode 28 can be formed at both ends of the width direction of the second current collecting unit 32, if it surely isolates between the anode 26 and the cathode 28.

Further, the embodiment described above has been dealt with the case where the anode compound slurry 31 is applied on both surfaces of the first current collecting unit 30 using a belt-shaped metallic foil to form the anode 26. However, this invention is not only limited to this, but if the anode active material is applied on the first current collecting unit 30 to form an anode, the active material to be applied on the first current collecting unit 30 is not needed to be in a slurry state. Similarly, the embodiment described above has been dealt with the case where the cathode compound slurry is applied on both surfaces of the second current collecting unit 32 using a belt-shaped metallic foil to form a cathode 28. However, this invention is not only limited to this, but if the cathode active material is applied on the second current collecting unit 32 to form a cathode, the active material to be applied on the second current collecting unit 32 is needed to be in a slurry state.

Furthermore, the embodiment described above has been dealt with the case where the first and second separators 25, 27 are formed from microporous polypropylene film. However, this invention is not only limited to this, but other materials can be used for the materials of the first and second separators 25, 27.

According to the present invention as described above, in the battery device in which the electrodes is formed by winding in the longitudinal direction the anode formed by applying the first active material on the belt-shaped first current collecting unit and the cathode formed by applying the second active material on the belt-shaped second current collecting unit through separators, the first active material is applied on the first current collecting unit avoiding one end and/or the other end of the width direction to form the anode and the second active material is applied on the second current collecting unit avoiding one end and/or the other end of the width direction to form the cathode. The current generated at the electrodes is output from the electrodes through the parts uncoated with the first active material of the anode and the parts uncoated with the second active material of the cathode, so that the current generated at the electrodes can be output regardless of the length of anode and cathode stably. Therefore, the battery device which has a high discharge current value and high current collecting efficiency at the electrodes can be realized.

While there has been described in connection with the preferred embodiments of the invention, it will be obvious to those skilled in the art that various changes and modifications may be aimed, therefore, to cover in the appended claims all such changes and modifications as fall within the true spirit an scope of the invention.

What is claimed is:

1. A battery device comprising:

an elongate substantially cylindrical anode terminal formed of a first metallic material;

an elongate substantially cylindrical cathode terminal formed of a second metal material different from said first metallic material;

a cylindrical insulating member including a first end telescopically engaging an end of said anode terminal and a second end telescopically engaging an end of said cathode terminal to define an elongate inner tube assembly;

an elongate stacked electrode assembly including a first separator sheet, an anode having a first elongate exposed conductive metal foil edge portion of said first metallic material extending outwardly from one side of said stacked electrode assembly, a second separator sheet and a cathode having a second elongate exposed conductive metal foil edge portion of said second metallic material extending outwardly from a side of said stacked electrode assembly opposite said first metal foil edge portion;

said elongate stacked electrode assembly being spirally wrapped around said inner tube assembly with said first separator sheet disposed adjacent said inner tube, the first metal foil edge of said anode being deformed radially inwardly so that turns of the first metal foil edge are disposed in physical and electrical contact with said anode terminal or with radially inner turns of said first metal foil edge circumferentially contacting said anode terminal, the second metal foil edge of said cathode being deformed radially inwardly so that turns of the second metal foil edge are disposed in physical and electrical contact with said cathode terminal or with radially inner turns of said second metal foil edge circumferentially contacting said anode terminal.

2. A battery device as defined in claim 1, wherein said first metal foil edge is physically and electrically connected to the anode terminal by supersonic welding or resistance welding.

3. A battery device as defined in claim 1, wherein said second metal foil edge is physically and electrically connected to the cathode terminal by supersonic welding or resistance welding.

4. A battery device as defined in claim 1, wherein said first metallic material comprises aluminum.

5. A battery device as defined in claim 1, wherein said anode comprises a first elongate rectangular metal foil member of said first metallic material having a length and a smaller width and active anode material disposed on opposed major surfaces of said first metal foil member less than the width of said first foil member to defined said first metal foil edge portion extending the length of said first metal foil member.

6. A battery device as defined in claim 5, wherein said active anode material comprises a slurry of about 91% by weight $LiCoO_2$, about 6% by weight graphite and about 3% by weight polyvinylidene fluoride.

7. A battery device as defined in claim 1, wherein said second metallic material comprises copper.

8. A battery device as defined in claim 1, wherein said cathode comprises a second elongate rectangular metal foil member of said second metallic material having a length and a smaller width and active cathode material disposed on opposed major surfaces of said second foil member less than the width of said second foil member to define said second metal foil edge portion extending the length of said second metal foil member.

9. A battery device as defined in claim 8, wherein said active cathode material comprises a slurry of about 90% by weight pitch coke and about 10% by weight polyvinylidene fluoride.

10. A battery device as defined in claim 1, further comprising;

an elongate outer tube having sealed end portions disposed around the stacked electrode assembly and a nonaqueous electrolyte disposed in said outer tube.

11. A battery device as defined in claim 10, wherein said nonaqueous electrolyte comprises a 1M solution of $LiPF_6$ dissolved in a mixed solvent of propylene carbonate and 1,2-dimethoxyethane.

* * * * *